United States Patent [19]

Kelm

[11] 4,301,521

[45] Nov. 17, 1981

[54] METHOD AND APPARATUS FOR DATA ACQUISITION AND TRANSPORT

[75] Inventor: Edward C. Kelm, Pasadena, Calif.

[73] Assignee: Geophysical Systems Corp., Pasadena, Calif.

[21] Appl. No.: 98,817

[22] Filed: Nov. 30, 1979

Related U.S. Application Data

[63] Continuation-in-part of Ser. No. 834,817, Sep. 19, 1979, Pat. No. 4,148,006.

[51] Int. Cl.³ .............................................. G01V 1/22
[52] U.S. Cl. ...................................... 367/78; 370/86; 370/88; 367/76
[58] Field of Search ................. 367/76, 78; 346/33 C; 370/86, 88

[56] References Cited

U.S. PATENT DOCUMENTS

| | | | |
|---|---|---|---|
| 3,786,418 | 1/1974 | Nick | 370/86 |
| 3,986,162 | 10/1976 | Chalez et al. | 370/88 |
| 4,140,993 | 2/1979 | Carter | 367/76 |
| 4,146,872 | 3/1979 | Carter | 367/76 |
| 4,148,006 | 4/1979 | Kelm | 367/76 |
| 4,201,890 | 5/1980 | Lawrence et al. | 370/86 |

*Primary Examiner*—Nelson Moskowitz
*Attorney, Agent, or Firm*—Daniel Silverman

[57] ABSTRACT

A data acquisition and transport system including a plurality of array terminals, each array terminal having a plurality of geophones delivering analog signals thereto, the analog signals being digitized to 1-bit and temporarily stored, and on demand, transmitted downline to a recording station, as a train of 1-bit pulses. The array terminals have two identical ports into which cable segments of two conductor digital transmission channels can be plugged. Means are provided in the recording station to place a DC potential between the two terminals of the digital transmission channel. In the array terminals means are provided for identifying which of the two identical ports is the one which receives the DC potential, which is identified as the downline port. On receiving a DC potential at the downline port, a corresponding DC potential is transmitted through the upline port to the next array terminal and so on. Means are provided for amplifying, digitizing to 1 bit, storing, and transmitting to the recording station the plurality of analog signals received from the geophones connected to an array terminal. Means are also provided for receiving trains of digital pulses from each of the upline array terminals at the upline port, storing them in shift registers, and then transmitting from the shift registers through the downline port, to the next downline array terminal.

9 Claims, 5 Drawing Figures

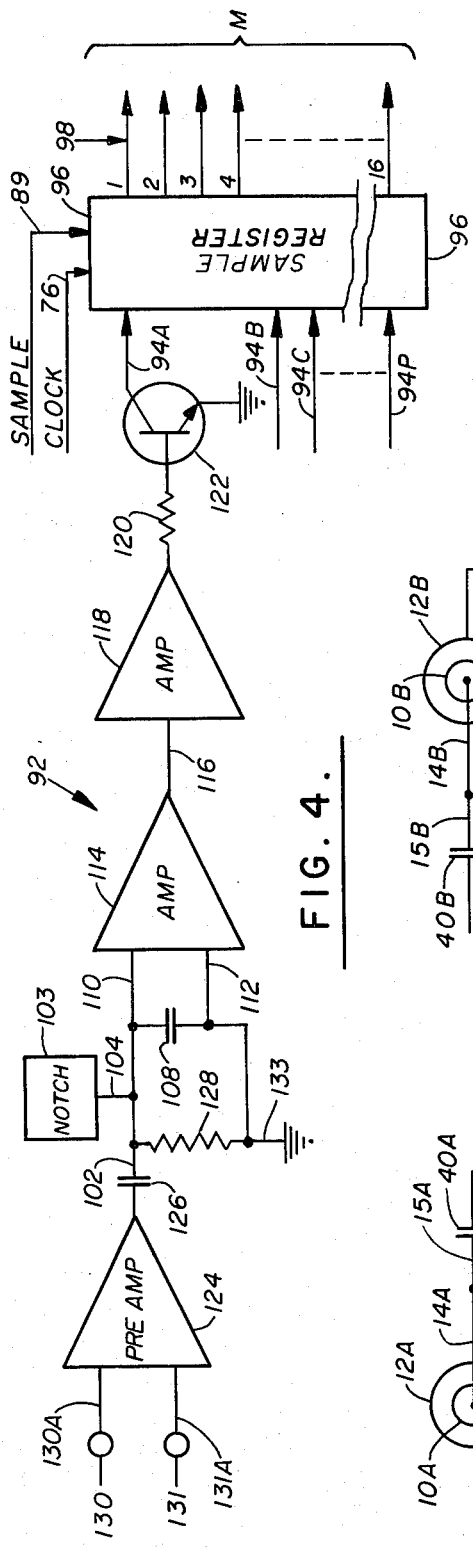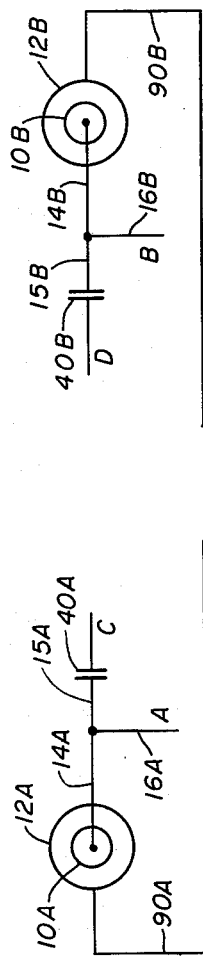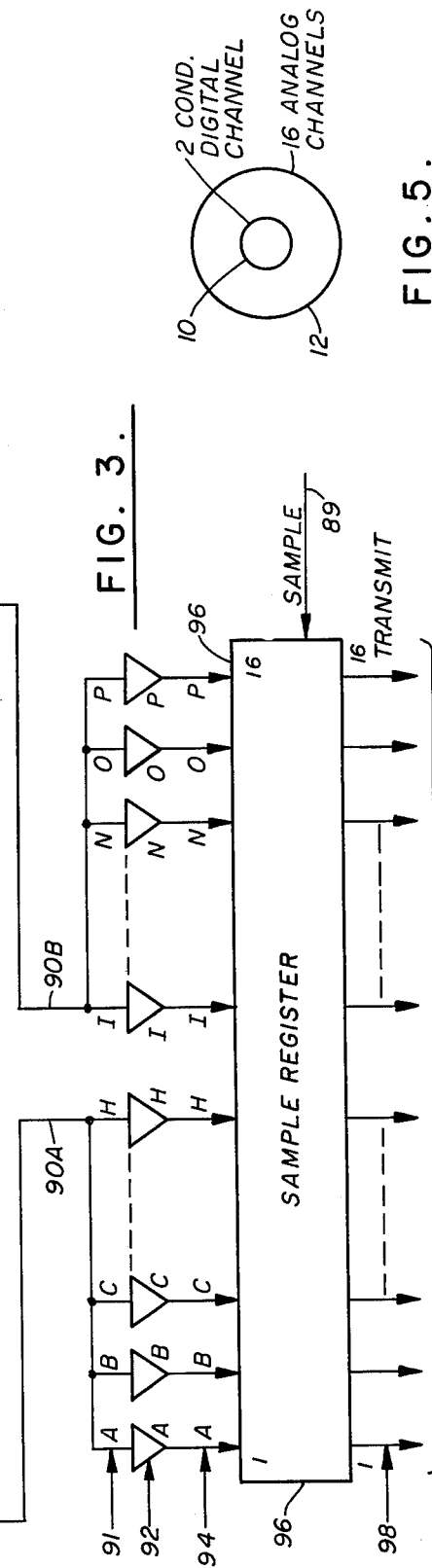

METHOD AND APPARATUS FOR DATA ACQUISITION AND TRANSPORT

CROSS-REFERENCE TO RELATED APPLICATION

This application is a continuation-in-part of my copending application, Ser. No. 834,817, filed Sept. 19, 1977 entitled, "Seismic Cable for Use with Array Terminal Type Acquisition Systems", now U.S. Pat. No. 4,148,006 Application Ser. No. 834,817 is incorporated into this application by reference.

BACKGROUND OF THE INVENTION

1. Field of the Invention

This invention lies in the field of data acquisition systems in general. More particularly, this invention relates to acquisition systems that have a high plurality of signal sources, such as geophones, and which utilize array terminals for gathering analog signals from each of a plurality of signal sources.

Still more particularly, this invention relates to a system for seismic operations for gathering geophone signals, converting them in array terminals to 1-bit digital signals, and transporting these signals as trains of 1-bit pulses to a central recording station.

2. Description of the Prior Art

In the prior art there are a number of patents which describe a wide variety of data acquisition systems, which use a common two-conductor digital signal line. In these systems each sensor or source of analog signals comprises a separate entity with power supply, amplifier means, digitizing means, storage means, and transmitting means, to apply on demand a digital word to be transmitted down the two-conductor line to the recording station.

In a series of patents recently issued, there is described a type of acquisition system in which a great number of analog signal sources are provided in groups, each group being connected into a separate array terminal, where each of these signals are amplified, digitized to 1 bit, and stored, and then transmitted down a two-conductor line to the next downline array terminal, and so on, into the central storage means.

This invention is an improvement on the latter type of acquisition system, and provides an improved method of cabling between the array terminals, and improved circuitry in the array terminals for amplifying and digitizing the analog signals and for relaying the digital signals from upline array terminals, and so on.

SUMMARY OF THE INVENTION

It is a primary object of this invention to provide a simple acquisition system in the form of a plurality of array terminals which are serially connected by lengths of two-conductor digital data transmission channels, between array terminals and between the first array terminal and the recording station.

Each of the array terminals have two identical ports, or receptacles, into which cables are plugged, one going downline to the next array terminals toward the recording station, and one going upline to the next array terminal away from the recording station. All cables are identical and either end of the cables can be plugged into either one of the two ports of the array terminals.

In operation, all of the array terminals are connected in series between cable segments, and through cable segments to the recording station.

Means are provided in the array terminal for determining which port is the downline port, toward the recording station, and which is the upline port. All interrogations and commands which are received from the recording station enter the array terminal through the downline port and are repeated through the upline port to the next upline array terminals. Similarly, digitized analog signals, in the form of digital data words are transmitted downline from each of the array terminals to the next inline, downline array terminal where they are re-transmitted to the next downline array terminal, and so on, to the recording station.

In this system the two-conductor, or two-member digital transmission channel may be a two-wire circuit, a co-axial cable circuit, ratio, optical, or other means of transmitting a train of binary pulses. In this sytem the digital transmitting medium is broken at the array terminals, and the received digital pulses from upline array terminals are re-shaped, stored, and then transmitted downline.

Means are provided in the central recording station, or central storage means, to initiate a DC potential across the two elements of the digital transmission channel, which travels over the first cable to the first array terminal. In the array terminal means are provided to determine which port receives the DC potential. This port is then labeled for the remainder of the transmission as the downline port, and the other is labeled as the upline port. As soon as the DC potential is received at the downline port, a similar DC potential is transmitted through the upline port to the next array terminal, and so on.

There are means in the array terminal to receive a plurality of analog signals, one over each of a plurality of conductor pairs. Half of the conductor pairs come into the array terminal through one port, and the other half through the other port. These signals are amplified, sampled, and stored in a register. On receipt of an interrogation signal through the downline port, these digital samples are transmitted as a digital word downline to the next array terminal.

There are two shift registers. The incoming digital signal is decoded and pulse-formed through a Schmitt Trigger and the data and derived clock are transmitted to a switching means. Alternate data words (say the odd-numbered words) go into one of the two shift registers and intermediate words (say the even-numbered words) go into the second shift register. Assume the first received word goes into the first shift register, then while the second word is going into the second shift register, simultaneously the digital word stored in the first shift register is coded for transmission and sent through the downline port to the next array terminal and to the central recording station.

BRIEF DESCRIPTION OF THE DRAWINGS

These and other objects and advantages of this invention and a better understanding of the principles and details of the invention will be evident from the following description taken in conjunction with the appended drawings, in which:

FIG. 3 is a schematic diagram indicating the analog station of the array terminal comprising the plurality of amplifiers, and the means for digitizing and storing these signals, and transmitting them through the downline port.

FIG. 4 is a schematic diagram of the analog amplifier.

FIG. 5 is a detail of the notation for the cable ports.

DESCRIPTION OF THE PREFERRED EMBODIMENTS

Figure 1:
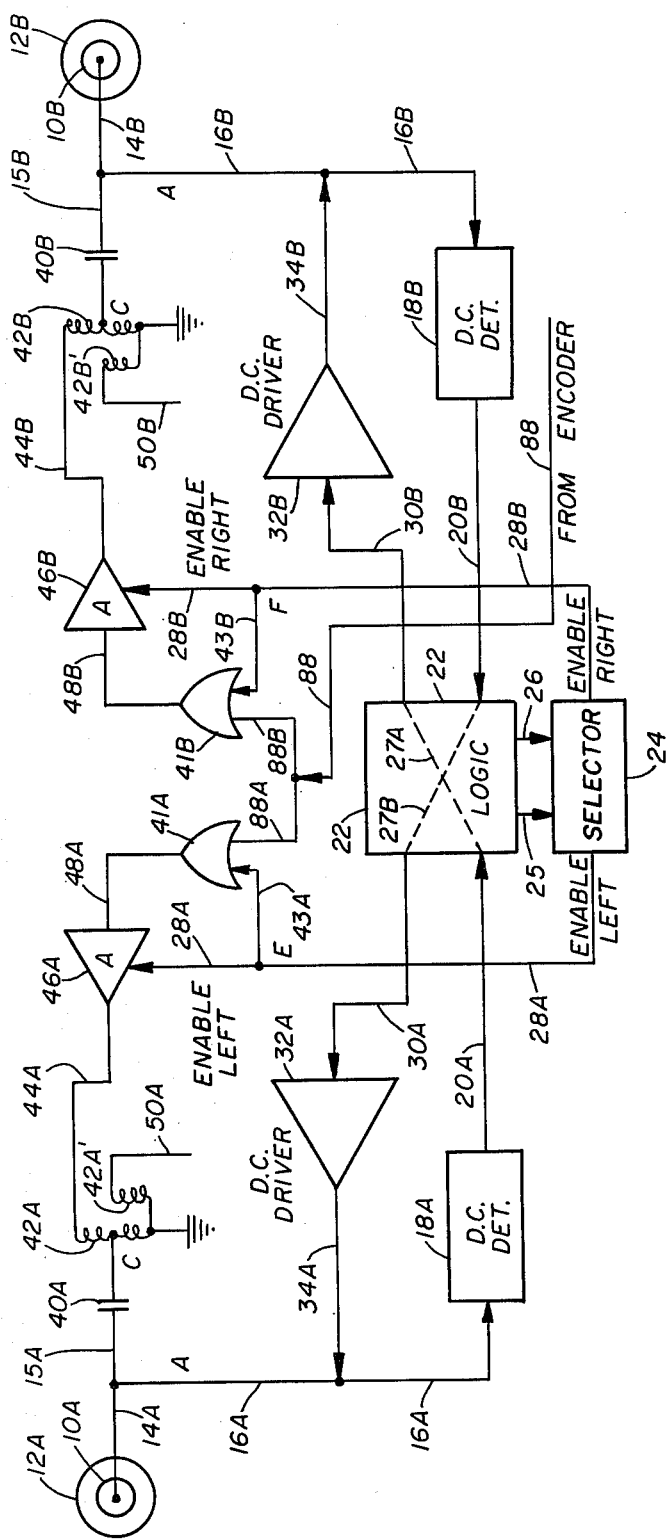
FIG. 1 shows in block diagram form the apparatus for determining which of the two identical ports in the array terminal is a downline port and which is an upline port.

Referring now to the drawings and in particular to FIG. 1, there is shown in schematic form a portion of the equipment in the array terminal. Each of the two ports is represented by the circles 10 and 12. For convenience, one port, namely, the right-hand port, will be considered the downline port, 10B and 12B, while the upline port will be 12A and 10A. Circles 10A and 10B represent the two-conductor digital transmission channel, and circles 12A, 12B represent multiple analog signal channels.

Lead 14A goes from the upline port of the two-conductor digital transmission channel to a conductor 16A, to a detector of DC, 18A. Similarly, there is a downline digital transmission channel 10B going to conductors 14B and 16B, to a detector of DC 18B. Both of these detectors of DC are identical, and are adapted to detect the presence of a DC potential of a selected magnitude and polarity on the digital transmission channel.

The two outputs of the two DC detecting elements 18A and 18B go by leads 20A, 20B into a logic box 22, which simply represents a grouping of logic gates, such that a DC potential appearing on one or the other of the conductors 16A or 16B, will set the logic such that any transmission of DC arriving on say line 16B, will be forwarded to the opposite port, the upline port, through line 30A, for example, and vice versa.

The DC terminal remains applied until a complete record is received. So long as the DC potential remains applied, a distinction is made between the two ports, such that one is the downline port, over which the DC potential arrived, and the other is the upline port, through which a buffered DC signal is provided from the buffer 32A through leads 34A, 16A, and 14A to the upline digital transmission channel 10A, and thence to the DC detection element of the next upline array terminal.

Once the logic box 22 recognizes the downline port on the basis of detection of a DC potential on either 16A or 16B, then a selector 24 is driven over leads 25 and 26 to provide two leads 28A and 28B which control the outgoing digital signals throuh gates 41A or 41B and amplifiers 46A or 46B to the downline port.

Figure 2:
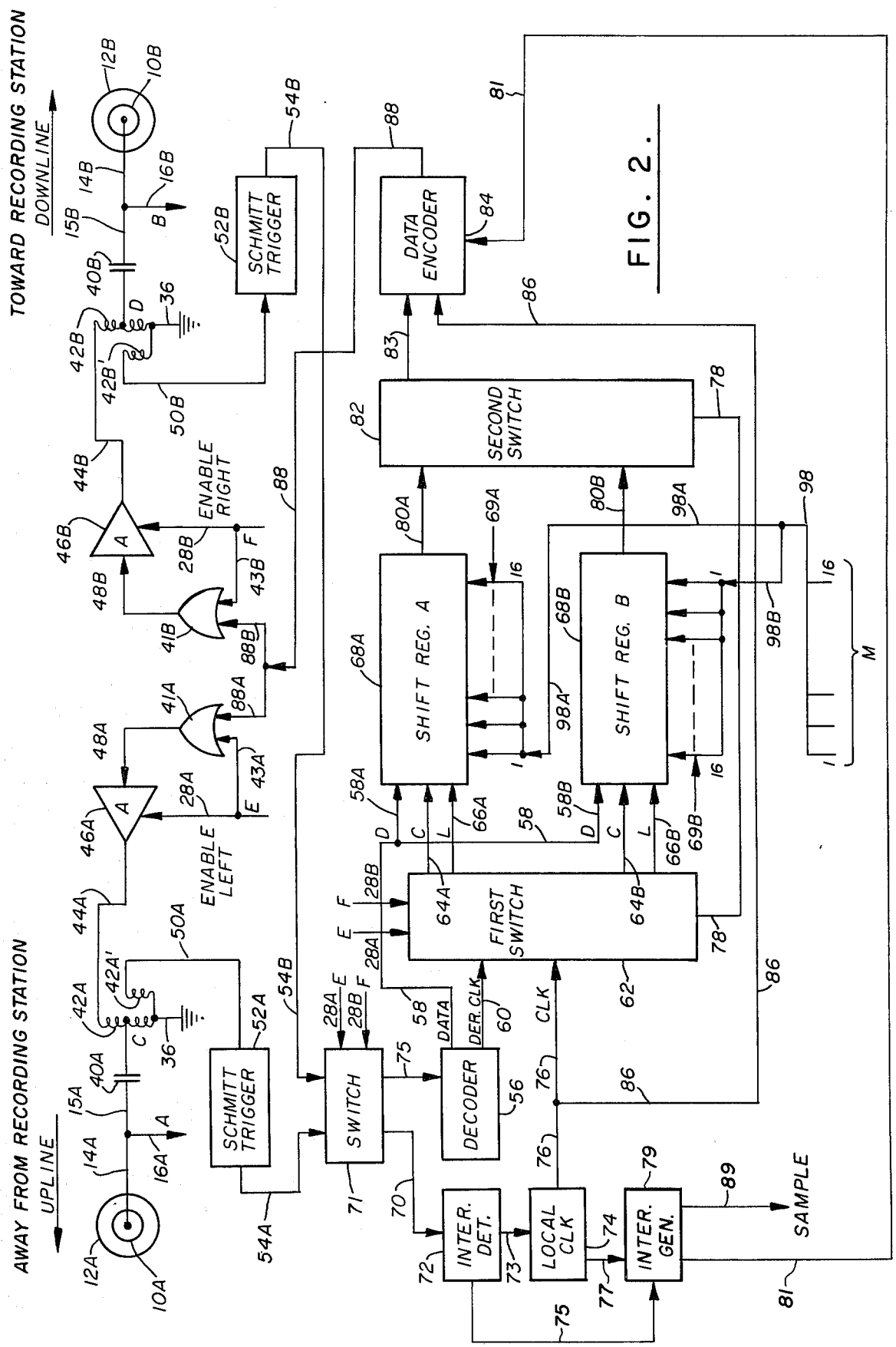
FIG. 2 illustrates in block diagram form the apparatus in the array terminal which is concerned with receiving digital signals through the upline port, storing thereon, and retransmitting them through the downline port to the next array terminal.

Referring now to FIG. 2, there is shown in block diagram form, the apparatus in the array terminal which receives the digital data in the form of binary digital pulses, or words, comprising groups of pulses, through the upline port, previously determined by the apparatus of FIG. 1. Considering again, as in the case of FIG. 1, that the port 10A is the upline port, the digital signals from an upline array terminal come through port 10A, lines 14A and 15A, through a series capacitor 40A, to an input transformer 42A. The voltage across the secondary 42A' of this transformer is carried by lead 50A to a Schmitt trigger 52A. The purpose of this is to detect each of the transmitted pulses, which may not be perfectly square pulses, due to the transmission over the channel, and to convert these pulses into square binary pulses. The output of the Schmitt trigger 52A goes by lead 54A to a switch 71 which is controllable by the enable signals on lines E, F, 28A, 28B from the selector 24 of FIG. 1.

Similarly, still assuming that port 10A is the upline port, any digital interrogation signals from a downline array terminal come through port 10B, lines 14B and 15B, through series capacitor 14B, transformer 42B, secondary 42B', lead 50B, Schmitt trigger 52B, and lead 54B to the other input of switch 71.

The switch 71 routes the downline port incoming interrogation signals from the direction of the recording station to an interrogate pulse detector 72 over line 70, and routes the upline port incoming data signals to the decoder 56 over line 75.

Various types of interrogation commands can be used. In general, a group of pulses, plus and minus, are provided, such that they can be readily recognized. When the interrogate detector 72 receives the interrogation signal and determines that it is a true interrogation signal, it transmits an enable pulse on line 73 to the local clock 74, which starts producing a series of clock pulses on leads 76 and 86.

The interrogate detector 72 and local clock 74 are connected through lines 75 and 77 to the interrogate generator 79 which causes repetition of the interrogation pulses through line 81 to the upline port, and thus to the next upline array terminal, shortly after detection of the interrogation pulse from the downline port. The signal on lines 76 and 86 synchronize transmission of the digital data words through the downline port toward the recording station.

The first data word, sent through the downline port shortly after the interrogation command is received from downline, is the digitally encoded data word representing one time sample for each of the data channels connected to the array terminal under discussion, through port connections 12A and 12B. Data words transmitted downline subsequent to this first transmission, but prior to the next interrogation command, are the re-shaped data words received in order through the upline port from the next array terminal in the upline direction. Thus for each interrogation pulse received, the array terminal sends downline one word of its own data and also repeats downline all data words received from the upline direction.

It is well known in the transmission and recording, such as on magnetic tape, of digital signals, that there are a number of forms in which digital data may be coded, in order to gain certain advantages. There is a form of coding called phase encoding, which has a distinct advantage. In phase encoding, the clock; that is, the timed intervals at which these pulses are transmitted, can be derived from the phase encoded signal very simply. It therefore becomes a convenient type of coding where self clocking data received on one line is decoded and stored, and then retransmitted on another line using a different clock. The purpose of the decoder 56, therefore, is to take the squared-up received data pulses from the Schmitt trigger, and produce a derived clock signal which goes out on line 60 and the data, which go out on line 58 to a first shift register 68A by lead 58A, or to a second shift register 68B by lead 58B.

The purpose of the switch 62 is to control the incoming data being received at the upline port 10A and to store the digital pulses in either one, or the other, of the two shift registers; shift register A, 68A, or shift register B, 68B. The switch 62 controls the clock pulses to the two registers 68A, 68B so that the derived clock will be sent to the one which is being loaded and the local clock is sent to the register into which data have previously been loaded and which is to be transmitted out. The incoming data go to both registers, but is only recorded properly in the one having the derived clock. The derived clock goes to switch 62 over lead 60, and the local clock over lead 76.

The purpose of the derived clock signal on lead 60 is so it can be applied to the clock lead 66A, so that the data pulses on 64A will be timed properly into the shift register A, exactly as they are timed coming into the array terminal. Similarly, when the data previously recorded in the sift register B, for example, is transmitted out over lead 80B, it is transmitted or shifted out, at the clock rate of the local clock 74 that goes tnrough lead 76 to the first switch 62 and then through 66B to the shift register 68B.

When the third digital word comes in at the upline terminal 10A, it is shifted into the shift register A, the fourth one into shift register B, etc., and alternate ones thereafter into the first or second shift registers. While one incoming word is being shifted into one register, the previously stored word in the second register is shifted out, at the local clock rate, through leads 80A or 80B, and the second switch 82, which is timed to be in synchronism with the first switch 62 over lead 78.

The second switch, for example, serves to connect outlet 80A of shift register A to the outgoing line 83, and then on the next cycle, to connect the outlet 80B of the shift register B to the outline 83, and so on. This is done in synchronism with the shifting of the incoming words, first into shift register A, and then into shift register B, and so on.

The outgoing words on line 83 go to a data encoder 84, which is a counterpart of the decoder 56 and serves to convert the data pulses into any selected form of data coding, such as, for example, the phase encoded data, which is well known in the art. The output of the data encoder goes by line 88 to lines 88A and 88B, through the gates 41A or 41B, and to the amplifiers 46A or 46B, dependent on the enable signal on 28A or 28B.

On the basis that it has been chosen to call the port 10B, the downline port, any output data words must go through the downline port. Consequently, the data signals on line 88 from the data encoder go to line 48B, through an amplifier 46B, through line 44B, to the output transformer 42B, and through the series capacitor 40B, lines 15B, 14B, to the downline port 10B of the digital transmission channel.

The purpose of the series capacitor 40B is to isolate the signal apparatus and input transformer 42 from the DC which is applied to the ports 10A and 10B. The DC is then limited solely to the lines 14 and 16 and the apparatus shown in FIG. 1. The digital interrogation and data signals pass through the series capacitors 40, and the transformers 42, and so on.

In FIGS. 1, 2, and 3, the ports and immediate apparatus close to the ports, such as the lines 14, 15, capacitor 40, and line 16, are shown. FIG. 1, which illustrates the DC portions of the array terminal circuits, does not show full detail of the digital circuits, but it does show the transformers 43, lines 44, and amplifiers 46. In FIGS. 2, which illustrates the digital equipment, the DC portion is terminated at 16A and is labeled A, and 16B, which is labeled B. The purpose of the letters A, B, C, and D, is to show junction points, so that it will be clear that the complete circuit of the array terminal will be the super-position of FIGS. 1 and 2, where the points A, B, C, and D of one figure will join the corresponding points of the other figure.

In FIG. 2, the output lead 88 from the data encoder 84 goes to lines 88A and 88B to gates 41A, 41B to leads 48A, 48B and amplifiers 46A, 46B respectively. The gates 41A or 41B are enabled over leads 43A or 43B from leads E or F, 28A, or 28B, which are the enabling lines from the selector 24 of FIG. 1. Thus, when the DC signal arrives, and it is determined that 10B, for example, is a downline port, then the selector 24 determines that the digital data signals to be transmitted must go through amplifier 46B, and so the lead 28B is enabled, to permit amplifier 46B to transmit the output signals to the port 10B, while the amplifier 46A is disabled, by the lack of appropriate signal on 28A.

There is a third important part of the circuitry of the array terminal, and that is the analog circuitry. This is shown in FIG. 3. Again, the two ports 10A, 12A, and 10B, 12B are shown with the immediate DC and digital signal circuitry leading to junction points A, B, C, and D.

FIG. 3 is concerned with the analog signals which arrive from the sensors, or geophones, which come in on a plurality of conductor pairs, symbolized by the circle 12A. By reference to my co-pending application, Ser. No. 834,817, now U.S. Pat. No. 4,148,006 the physical cabling system that connects to each of the array terminals has two sets of conductors. One set is a conductor pair for the digital transmission channel. The other set comprises a plurality of conductor pairs, for connection to geophones, or other sensors, placed at known positions around the individual array terminals. The cable system that has been provided includes a plurality of S conductor pairs in the cable which is connected to 1 port, which are connected to S geophone groups spaced out from the array terminal, one-half of the distance to the next array terminal. The second cable at the other port provides an additional S conductor pair to another group of S geophone groups. Thus, half of the geophone inputs are brought in through each of the two ports.

This is shown in FIG. 3 by the lines 90A, and 90B, each of which carry a plurality of S conductor pairs, 91A, 91B . . . 91P. These go to individual amplifiers 92A, 92B, 92C . . . 92P, whose gains and output limits are adjusted so that only two values, high or low, may appear at their outputs. The output of the amplifiers 92, on leads 94, are connected to a sample register 96. The sample register 96 on a sample command over lead 89, derived from the interrogation command, samples each of the outputs 94 of the amplifiers 92 and inserts into each of the cells of the register a digital bit which may be of a one or a zero, corresponding to the instantaneous state of the signals on the leads 94. Thus the instantaneous state of each of the plurality of 2S geophone signals is sampled and stored in the register 96, and a high or low signal, representative of a one or a zero, appears on leads 98. These leads are numbered 1 to 16 corresponding to each of the sixteen geophone groups connected to the 16 conductor pairs, 8 upline and 8 downline from the array terminal.

In FIG. 2, the shift registers 68A and 68B can be loaded serially over data lines 58A and 58B, and unloaded serially over output leads 80A and 80B respectively. They can also be loaded in parallel over input leads 69A and 69B, on proper signal over the "load" lines 66A and 66B. The sixteen leads 98 from the sample-and-hold register 96 (labeled M as a group) go to the M leads 98 in FIG. 2. These 16 leads are connected through 98A and 98B to the input leads 69A and 69B of the registers 68A and 68B respectively.

Note, however, that they are loaded in opposite sequence, 1–16, and 16–1 on the two registers. Thus, depending on which port is the downline port, they can be loaded into one or the other of the two registers, so that when they are serially unloaded, they will be in the correct sequence, corresponding to the downline port. In other words, if 12B is the downline port, geophone signal 91P should be the first to be unloaded. Thus, the M signals will be loaded into 68A, so that 16 will be the first bit to be unloaded and sent downline to the recording station.

Thus, each array terminal has two important jobs; one is to receive analog signals from a plurality of 2S geophones which are amplified, converted to 1-bit signals, sampled, and then transmitted on command as a digital word comprising a plurality of digital pulses, or bits, through the data encoder and out through an output amplifier 46, transformer 42, output capacitor 40, to the digital conductor pair 10 to the next downline array terminal.

Each array terminal must also receive the digital word from each of the upline array terminals, over the digital transmission channel, temporarily store these in the shift registers A or B, and then transmit them from the shift registers downline to the next array terminal, and so on.

In FIG. 5 is shown the diagram of a port of the array terminal, described with a small diameter circle 10 and a larger diameter circle 12. The small circle represents a two-conductor digital transmission channel, and the larger circule represents a group of S analog, two-conductor channels.

Referring now to FIG. 4, there is shown in schematic form one embodiment of an analog amplifier indicated generally by numeral 92, to connect between the terminals 130 and 131, to receive the output signal of a single sensor or geophone group. The signal is received differentially over lead 130A, 131A by preamplifier 124, the output of which goes to output capacitor 126 and load resistor 128. The signal may be filtered, if desired, by a notch filter 103 over lead 104. The signal then goes to an analog amplifier 114. The other input lead of the amplifier is ground 133. The output of the first amplifier 114 goes by lead 116 to a second amplifier 118 and through a coupling resistor 120 to a transistor 122, the output of which is a unipolar high level voltage on lead 94A, to be sampled into the register 96.

The high amplification of the analog signal causes the output signal to be amplitude-limited, having vertical transitions representing the times of the zero crossing of the analog signal. Thus, the output voltage on 94A is two-valued, either high or low at any instant. This voltage is clocked into the register 96 as a digital 1 or a digital 0, depending on whether it is a high voltage, or a low voltage, at the instant of the clock pulse on 76.

There will be 16 amplifiers 92 connected on their outputs to leads 94A, 94B . . . 94P. Thus on the signal to sample, 16 samples will be loaded simultaneously, one into each of the 16 cells in the register 96. Also, appropriate potential will appear on the output leads 98, to be loaded into the shift registers 68A, 68B.

While many variations of the analog amplifier of FIG. 4 can be devised, the specific form of such amplifier is not critical. The important point is that the amplification is at high gain, forming a two-value signal which is then sampled and stored in the register 96 and the shift registers 68A, 68B later to be read out in series on the leads 80A, or 80B, encoded by 84 and transmitted downline through line 88 and amplifier 48 to the central recording station.

What has been described is an array terminal, for use in a data acquisition system, in which analog signals are carried into the array terminal, half of them through each of two identical ports. The analog cables from one array terminal do not reach to the other array terminal, they only go halfway. However, the digital transmission circuit is connected between the digital terminals of the ports in each array terminal directly to the next array terminal, and so on. Because of the convenience of interchangeable cables, and plugs, and troublefree operation by having two ports of the array terminal identical, it is necessary to have means, such as shown in FIG. 1, to identify which is the downline port, and so on. Thus, information controls are locked in the circuitry so that the digital data are transmitted out of the port which receives the DC signal, and so on. Each of the digital words transmitted from upline terminals are not transmitted continuously through the digital channel, but are received into an array terminal, digital pattern reformed, decoded, processed, stored, and then transmitted again to the next array terminal, where the process is repeated.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a data acquisition system in which a plurality of array terminals (ATs) are connected in series between successive two conductor digital signal cables, to a central recording station, each of said ATs having two identical cable ports, the plugs at the ends of said digital identical cable ports, the plugs at the ends of said digital signal cables, all identical, and adapted to be plugged into either one of said two ports;

the improvement in apparatus for determining which port of an array terminal is the downline port leading to said signal recording station, and which is the upline port leading to the next AT farther from the recording station, comprising;
(a) means in said central recording station to apply a continuous DC voltage of selected magnitude and polarity to the end of the first digital signal cable connected between the central recording station and the first AT, said voltage applied between the two conductors of said channel;
(b) two DC voltage detecting means (VDM) in said first array terminal, one connected to the two digital conductor terminals in each of said two ports;

(c) logic means connected to both of said VDM, to determine which of said VDMs detects a DC voltage, the port connected to that VDM being the downline port, the other port being the upline port;

(d) DC voltage amplifying means to produce a DC voltage of selected magnitude and polarity; and (e) means, responsive to said logic means, to connect said DC voltage amplifying means to the two digital conductor terminals in said upline port;

whereby said amplified DC voltage will travel through the second digital signal cable from said upline port of said first AT to one of the ports of the next upline AT.

2. In a data acquisition system in which a plurality of array terminals (ATs) are connected in series between successive two conductor digital signal cables, to a central recording station, each of said array terminals having two identical cable ports, the plugs at the ends of said digital signal cables, all identical, and adapted to be plugged into either one of said two ports;

the improvement in apparatus in an AT for receiving digital data words from an upline AT, and transmitting said data words to a downline AT, comprising, (a) means in said AT for determining which port is the downline port, the other being the upline port;

(b) means for receiving a first digital word at said upline port, and means for deriving the incoming clock of the digital pulses of said digital word;

(c) means to store said first, and successive odd numbered digital words in a first shift register, and to store the second and successive even numbered digital words in a second shift register, at said determined incoming clock rate;

(d) local clock means in said AT providing time pulses at the local clock rate;

(e) means simultaneously to transmit an even numbered digital word from said second shift register downline to the next AT, at the local clock rate, while an odd numbered word is being stored in said first shift register at the incoming clock rate, and vice versa.

3. The system as in claim 2, including means to reform the incoming binary pulses into square digital pulses.

4. The system as in claim 2 including means on the output of said shift registers to code the digital signals, prior to amplification and transmission through said downline port.

5. The system as in claim 2 including means to decode the digital signals which are received at said upline port.

6. The system as in claim 5 including transformer means between said upline port and said means to decode.

7. In a data acquisition system in which a plurality of array terminals (ATs) are connected in series between successive two conductor digital signal cables, to a central recording station, each of said ATs having two identical cable ports, the plugs at the ends of said digital signal cables, all identical, and adapted to be plugged into either one of said two ports;

the improvement in apparatus for receiving a plurality of analog signals into an array terminal, and for amplifying each of said analog signals, sampling at selected time intervals said analog signals, storing and transmitting said samples downline to the next AT as trains of electrical pulses, comprising;

(a) two cables, one plugged into each of said two identical cable ports, at least a plurality of K conductor pairs in each cable, each connected to at least one seismic sensor, spaced relatively upline and downline from said AT;

(b) means to amplify at high gain each of said plurality of 2 K analog signals to form a plurality of 2 K two-valued signals;

(c) means on command to sample each of said two-valued signals to form binary samples, and means to store each of said plurality of binary samples; and (d) means on command to transmit said plurality of binary samples through said two conductor digital signal cables to the next downline AT and to said central recording station.

8. The apparatus as in claim 7 in which said means to sample and to store comprises;

(a) sample register means having 2 K parallel inputs, one connected to the output of each of said means to amplify and 2 K parallel outputs;

(b) a first and a second shift register having at least 2 K inputs in parallel and one output for transmitting said 2 K binary samples in sequence;

(c) means to connect said 2 K outputs from said sample register to the 2 K inputs of said first shift register, in a first sequence;

(d) means to connect said 2 K outputs from said sample register to the 2 K inputs of said second shift register in a second sequence, opposite to said first sequence;

whereby the 2 K binary samples storing in said storage registers can be shifted out in either said first or said second sequence.

9. The apparatus as in claim 7 in which said K conductor pairs for analog signals are part of the same cable that carries said two conductor digital signal cable.

* * * * *